Oct. 16, 1934.          R. K. LEE          1,976,789
VIBRATION DAMPER
Filed June 15, 1928

INVENTOR
ROGER K. LEE.
BY
ATTORNEY.

Patented Oct. 16, 1934

1,976,789

UNITED STATES PATENT OFFICE 1,976,789

VIBRATION DAMPER

Roger K. Lee, Detroit, Mich., assignor to Chrysler Corporation, Detroit, Mich., a corporation of Delaware Application June 15, 1928, Serial No. 285,721

16 Claims. (Cl. 74—574)

This invention relates to a vibration damper, illustrated as embodied in the crankshaft of an internal combustion engine.

Specifically the invention relates to yieldingly mounting a relatively small flywheel on the crankshaft preferably on one end thereof remote from the end to which the main flywheel is connected. The primary purpose of such a device is to dampen out or reduce torsional vibrations set up in the crankshaft usually caused by impulses imparted to the shaft in synchronism with the natural period of vibration of the shaft.

An important object of the invention is to provide a structure which is inexpensive to manufacture, one that will be efficient in its operation, and one which is in effect a single unit with its parts integrally joined together.

Broadly, the invention consists of the combination of a crankshaft and an inertia member connected thereto by a resilient means which permits relative movement of the inertia member with respect to the crankshaft. Preferably the resilient member is formed from a ring of rubber having one of its surfaces vulcanized to the inertia member and another surface vulcanized to the crankshaft or a part detachably secured to the crankshaft.

Other objects and advantages will more fully appear from the following description taken in connection with the accompanying drawing, in which.

Figure 1:
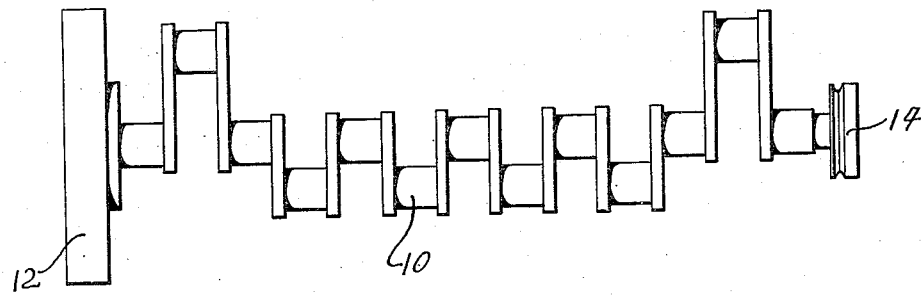
Fig. 1 is a side elevation of a crankshaft showing an adaptation of my invention.

Referring to the illustrated embodiment of my invention, I have shown a crankshaft 10. At one end of the crankshaft the usual flywheel 12 has been provided and at the opposite end I have provided my improved damper, indicated by the reference numeral 14.

Figure 2:
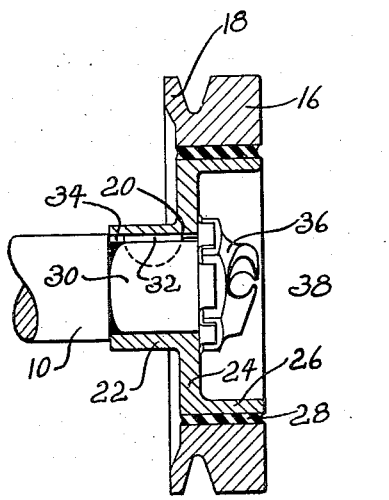
Fig. 2 is an enlarged sectional view through the damper showing the inertia member resiliently mounted to a member detachably secured to the end of a crankshaft.
Figure 3:
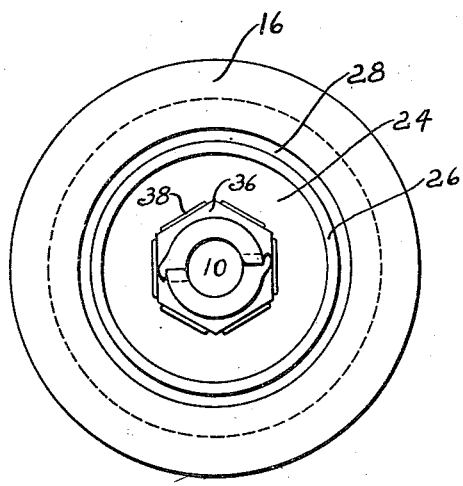
Fig. 3 is a view showing in elevation an end view of the damper shown in Fig. 2.

Referring particularly to Fig. 2, the damper comprises an inertia member 16 in the form of a relatively small flywheel and in the form illustrated, a groove 18 is provided in its outer periphery which may receive a fan belt not shown. Detachably secured on one end of the crankshaft I have provided a member 20 having a hub portion 22, radial flange 24 and a cylindrical flange 26. The two members 16 and 20 are each provided with adjacent faces to which is vulcanized a rubber ring 28. The members are thus united as a single unit and the inertia member 16 is free for relative angular movement with respect to the member 20. In the form of my device shown in the drawing, the rubber ring 28 has its inner periphery vulcanized to the outer periphery of the flange 26 and its outer periphery vulcanized to the inner periphery of the inertia member 16.

The parts thus united are secured as a unit on the end of the crankshaft, preferably the forward end opposite the main flywheel 12. The hub portion 22 is received on a reduced portion 30 of the crankshaft. A key 32 in a groove 34 prevents rotation of the member 20 and a nut 36 in the form of a crank receiving member holds the member in position. A lock washer 38 is shown to prevent rotation of the nut 36.

It will be understood that when the crankshaft is rotating the inertia member is rotating with it in the same direction but yet is free for relative angular movement. The torsional impulses, whether caused by inertia forces or power impulses, cause relative angular movement between the inertia member and the crankshaft. The lag of the inertia member phase behind the crankshaft phase causes an opposition of forces which tends to hold the synchronous movement of the crankshaft to a minimum.

While I have described what I deem to be the preferred embodiment of my invention, it is to be understood that various changes including the size and arrangement of parts may be made without departing from the spirit of my invention and it is not my intention to limit its scope other than by the terms of the appended claims.

What I claim is:

1. In combination, a crank shaft for internal combustion engines having a part thereon provided with a portion having a broad face, a vibration damper for said shaft including an inertia member having a portion thereof provided with a broad face positioned directly opposite to said face of said part, and a relatively thin sheet of rubber of annular formation interposed between said faces and being vulcanized thereto.

2. In combination, a crank shaft for internal combustion engines having a member mounted thereon and provided with a portion having a broad peripheral face, an inertia device surrounding said member, the said device having a portion thereof provided with a broad face positioned directly opposite to said face of said member, and a relatively thin sheet of rubber interposed between said faces and surface bonded thereto.

3. In combination, a crankshaft for internal combustion engines having a part thereon provided with a portion having a broad face, a vibration damper for said shaft including an inertia member having a portion thereof provided with a broad face positioned directly opposite to said face of said part, and a relatively thin sheet of rubber interposed between said faces and surface bonded thereto.

4. In combination, a crankshaft for internal combustion engines having a part thereon provided with a portion having a broad face, a vibration damper for said shaft including an inertia member having a portion thereof provided with a broad face positioned directly opposite to and in juxtaposed relation with said face of said part, and a relatively thin sheet of rubber interposed between said faces and surface bonded thereto.

5. In combination, a shaft rotated by an internal combustion engine and subjected to torsional deflection produced by the explosive forces of the engine, means to break up the periodicity of the torsional deflection of said rotatable shaft including a vibration damper for said rotatable shaft including an inertia member, said rotatable shaft and said inertia member having adjacent faces, and a rubber member having its opposite faces bonded to said adjacent faces respectively and serving as the connection between said rotatable member and said inertia member.

6. In combination, a rotatable member subject to vibration, a vibration damper for said rotatable member including an inertia member, said rotatable member and said inertia member having adjacent faces, and a rubber member between said faces and surface-bonded thereto forming a driving connection between said rotatable member and said inertia member through shear tension on said rubber member.

7. In combination, a crankshaft for internal combustion engines having a part thereon provided with a portion having a broad face, a vibration damper for said shaft including an inertia member having a portion thereof provided with a broad face positioned directly opposite to said face of said part, and a sheet of rubber interposed between said faces and vulcanized thereto serving as the supporting and driving connection between said shaft and said inertia member by shear tension on said rubber.

8. In combination, a crankshaft for internal combustion engines having a part thereon provided with a portion having a broad cylindrical face, a vibration damper for said shaft including an inertia member having a portion thereof provided with a broad cylindrical face of greater diameter than said first mentioned face and positioned in spaced relation with said first mentioned face, and a cylindrical rubber member interposed between said faces and surface bonded thereto serving as the driving connection between said crankshaft and said inertia member through shear tension on said cylindrical rubber member.

9. In combination, a crankshaft for internal combustion engines having a detachable driven part thereon provided with a portion having a broad cylindrical face, a vibration damper for said shaft including an inertia member serving as a driving member and having a portion thereof provided with a broad cylindrical face of greater diameter than said first named cylindrical face positioned directly opposite to said first named cylindrical face, and a relatively thin cylindrical rubber member interposed between said faces and vulcanized thereto to serve as the driving connection between the detachable driven part on said crankshaft and said inertia member through shear tension on said rubber member.

10. In combination, a crank shaft for an internal combustion engine subjected to torsional deflection produced by the explosion forces of the engine, means to break up the periodicity of the torsional deflection of said crank shaft including an inertia member having a surface thereof spaced from a surface of said crank shaft, and a sheet of rubber interposed between said surfaces and vulcanized thereto serving as the driving connection between said shaft and said inertia member.

11. In combination, a shaft rotated by an internal combustion engine and subjected to torsional deflection produced by the explosive forces of the engine, means to break up the periodicity of the torsional deflection of said rotatable shaft including an inertia member having a surface thereof spaced from a surface of said rotatable member, and a sheet of rubber interposed between said surfaces and vulcanized thereto serving as the driving connection between said rotatable member and said inertia member.

12. In combination, a crank shaft for an internal combustion engine subjected to torsional deflection produced by the explosion forces of the engine, a flywheel secured to said crank shaft at one end thereof, means to break up the periodicity of the torsional deflection of said shaft including an inertia member at the opposite end of said crank shaft having a surface thereof spaced from a surface of said crank shaft, and a sheet of rubber interposed between said surfaces and vulcanized thereto serving as the driving connection between said shaft and said inertia member.

13. In combination, a shaft rotated by an internal combustion engine and subjected to torsional deflection produced by the explosive forces of the engine, means to break up the periodicity of the torsional deflection of said rotatable shaft, including a vibration damper for said rotatable shaft, including an inertia member, said inertia member having adjacent faces, and a ring-like rubber member vulcanized to the faces provided by the rotatable shaft and inertia member, respectively, and serving as a connection between the rotatable shaft and inertia member.

14. In combination, a shaft rotated by an internal combustion engine and subjected to torsional deflection produced by the explosive forces of the engine, means to break up the periodicity of the torsional deflection of said rotatable shaft including an inertia member, a yieldable connection for transmitting movement from the shaft to the inertia member, said yieldable connection comprising a rubber layer disposed between opposed surfaces provided by the rotatable shaft and inertia member, respectively, and being surface-bonded thereto.

15. In combination, a shaft rotated by an internal combustion engine and subjected to torsional deflection produced by the explosive forces of the engine, means to break up the periodicity of the torsional deflection of said rotatable shaft including a power torque transmitting connection connected to said shaft for transmitting the output torque of said engine, a vibration damper comprising an inertia member yieldingly mounted on said shaft by a layer of rubber positioned between surfaces provided by said shaft and said inertia member and surface-bonded thereto to form a driving connection therebetween, said vibration damper being positioned so as to be free from said output torque.

16. In combination, a rotatable member subjected to torsional deflection, means to break up the periodicity of the torsional deflection of said rotatable member including an inertia member, a yieldable connection for transmitting movement from the rotatable member to said inertia member, said yieldable connection comprising a rubber member vulcanized to parts provided by the rotatable member and inertia member, and forming a driving connection therebetween through shear tension on said rubber member.

ROGER K. LEE.